(12) United States Patent
Chen et al.

(10) Patent No.: US 7,464,302 B2
(45) Date of Patent: Dec. 9, 2008

(54) METHOD AND APPARATUS FOR EXPRESSING HIGH AVAILABILITY CLUSTER DEMAND BASED ON PROBABILITY OF BREACH

(75) Inventors: Ming Chen, Markham (CA); Thomas Juergen Lumpp, Reutlingen (DE); Juergen Peter Schneider, Althengstett (DE); Andrew Neil Trossman, North York (CA)

(73) Assignee: International Business Machines Corporation, Armonk, NY (US)

( * ) Notice: Subject to any disclaimer, the term of this patent is extended or adjusted under 35 U.S.C. 154(b) by 536 days.

(21) Appl. No.: 11/121,605

(22) Filed: May 4, 2005

(65) Prior Publication Data

US 2006/0253725 A1   Nov. 9, 2006

(51) Int. Cl.
*G06F 11/00* (2006.01)
(52) U.S. Cl. .......................................... 714/47; 709/224
(58) Field of Classification Search ..................... 714/4, 714/47; 709/224
See application file for complete search history.

(56) References Cited

U.S. PATENT DOCUMENTS

| | | | |
|---|---|---|---|
| 5,699,403 A * | 12/1997 | Ronnen | 379/15.04 |
| 6,446,134 B1 * | 9/2002 | Nakamura | 719/313 |
| 6,854,069 B2 * | 2/2005 | Kampe et al. | 714/4 |
| 2005/0050377 A1 * | 3/2005 | Chan et al. | 714/4 |
| 2005/0256942 A1 * | 11/2005 | McCardle et al. | 709/220 |
| 2005/0256946 A1 * | 11/2005 | Childress et al. | 709/223 |
| 2005/0278786 A1 * | 12/2005 | Tippett et al. | 726/25 |
| 2006/0015593 A1 * | 1/2006 | Vytas et al. | 709/221 |
| 2007/0043923 A1 * | 2/2007 | Shue | 711/170 |

* cited by examiner

*Primary Examiner*—Scott T. Baderman
*Assistant Examiner*—Kamini Patel
(74) *Attorney, Agent, or Firm*—Duke W. Yee; Jill A. Poimboeuf; Wayne P. Bailey

(57) ABSTRACT

A method, apparatus, and computer instructions are provided for expressing high availability (H/A) cluster demand based on probability of breach. When a failover occurs in the H/A cluster, event messages are sent to a provisioning manager server. The mechanism of embodiments of the present invention filters the event messages and translates the events into probability of breach data. The mechanism then updates the data model of the provision manager server and makes a recommendation to the provisioning manager server as to whether reprovisioning of new node should be performed. The provisioning manager server makes the decision and either reprovisions new nodes to the H/A cluster or notifies the administrator of detected poisoning problem.

1 Claim, 5 Drawing Sheets

$$\underbrace{PoB_{ApplicationGroup}}_{600} = \underbrace{ServiceClassFactor_{ApplicationGroup}}_{602} \underbrace{(\text{Required \# of active IT Servers}}_{604} - \underbrace{\text{\# of failed IT Servers})}_{606}$$

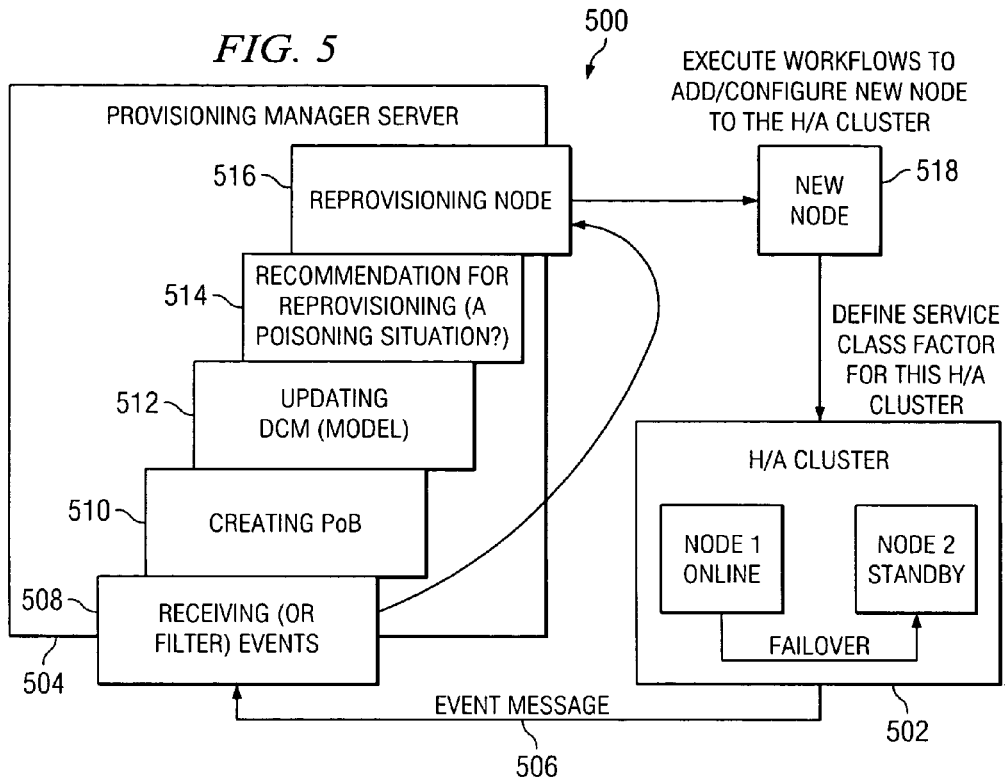
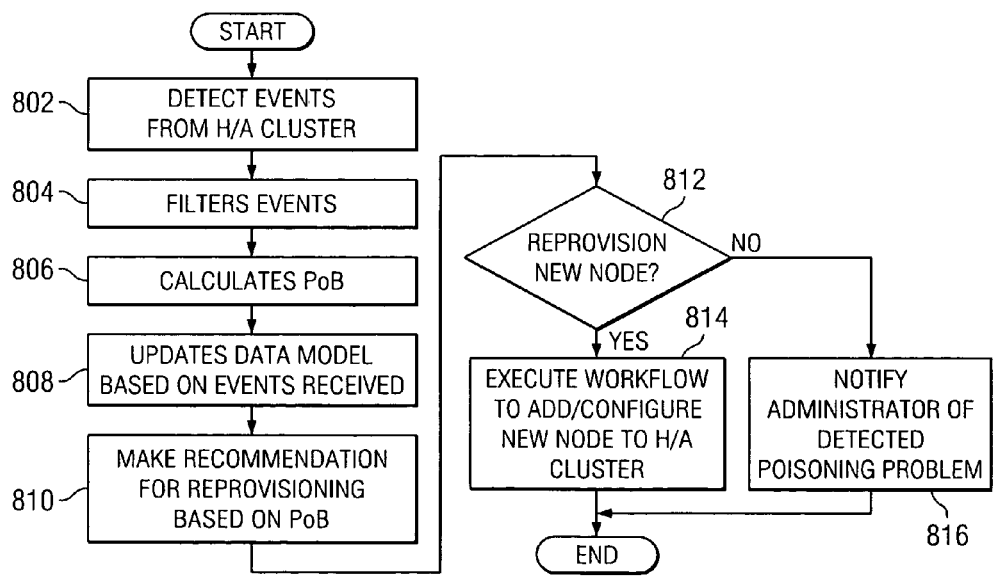

$$PoB_{ApplicationGroup} = ServiceClassFactor_{ApplicationGroup} \cdot (\text{Required \# of active IT Servers} - \text{\# of failed IT Servers})$$

FIG. 7

A COUPLE OF EXAMPLES:

700 — CASE 1: A 2 NODE CLUSTER ONE IS USED TO HOST THE WORKLOAD, THE SECOND IS A COLD BACKUP. SO THE NUMBER OF REQUIRED ACTIVE IT SERVERS IS TWO. THE ServiceClassFactor = 0.75

- 702 — $PoB = 0.75^2 = 0.56$ (NO ADDITIONAL IT SERVER REQUIRED) IN NORMAL PRODUCTION RUNNING
- 704 — $PoB = 0.75^{2-1} = 0.75$ (ONE ADDITIONAL IT SERVER REQUIRED) WHEN WE LOSE ONE IT SERVER
- 706 — $PoB = 0.75^{2-2} = 1.0$ (TWO ADDITIONAL IT SERVERS REQUIRED) WHEN WE LOSE THE COMPLETE CLUSTER

708 — CASE 2: A 4 NODE CLUSTER HOSTING TWO APPLICATIONS Appl1, Appl2. BOTH APPLICATIONS ARE USING TWO NODES SEPARATELY, BUT CAN USE EVERY OTHER NODE AS BACKUP. THE CUSTOMER REQUESTED A "SILVER" LEVEL GOAL, ACCEPTING THAT A BACKUP SERVER IS ALREADY USED.

- 710 — $PoB_{app1} = 0.5^4 = 0.0625$ (NO ADDITIONAL IT SERVER REQUIRED) IN NORMAL PRODUCTION RUNNING
- 712 — $PoB_{app2} = 0.5^4 = 0.0625$ (NO ADDITIONAL IT SERVER REQUIRED) IN NORMAL PRODUCTION RUNNING
- 714 — $PoB_{app1} = 0.5^{4-2} = 0.125$ (TWO ADDITIONAL IT SERVERS REQUIRED) WHEN WE LOSE TWO IT SERVERS
- 716 — $PoB_{app2} = 0.5^{4-2} = 0.125$ (TWO ADDITIONAL IT SERVERS REQUIRED) WHEN WE LOSE TWO IT SERVERS
- 718 — $PoB_{app1} = 0.5^{4-4} = 1.0$ (FOUR ADDITIONAL IT SERVERS REQUIRED) WHEN WE LOSE THE COMPLETE CLUSTER
- 720 — $PoB_{app2} = 0.5^{4-4} = 1.0$ (FOUR ADDITIONAL IT SERVERS REQUIRED) WHEN WE LOSE THE COMPLETE CLUSTER 722 — CASE 3: THE SAME SCENARIO AS CASE 2 BUT THE CUSTOMER REQUESTED A "GOLD LEVEL" HA SERVICE. THIS MEANS THAT FOR EACH APPLICATION WE NEED TWO ADDITIONAL SPARE BACKUP IT SERVERS. EACH IT SERVER IN THE HA CLUSTER IS DEDICATED FOR EITHER ONE APPLICATION.

- 724 — $PoB_{app1} = 0.75^4 = 0.31$ (NO ADDITIONAL IT SERVER REQUIRED) IN NORMAL PRODUCTION RUNNING
- 726 — $PoB_{app2} = 0.75^4 = 0.31$ (NO ADDITIONAL IT SERVER REQUIRED) IN NORMAL PRODUCTION RUNNING
- 728 — $PoB_{app1} = 0.75^{4-2} = 0.562$ (TWO ADDITIONAL IT SERVERS REQUIRED) WHEN WE LOSE ONE IT SERVER
- 730 — $PoB_{app2} = 0.75^4 = 0.31$ THERE IS NO CHANGE FOR Appl2, SINCE THE TWO LOST IT SERVERS WERE DEDICATED FOR Appl1
- 732 — $PoB_{app1} = 0.75^{4-4} = 1.0$ (FOUR ADDITIONAL IT SERVERS REQUIRED) WHEN WE LOSE THE COMPLETE CLUSTER
- 734 — $PoB_{app2} = 0.75^{4-4} = 1.0$ (FOUR ADDITIONAL IT SERVERS REQUIRED) WHEN WE LOSE THE COMPLETE CLUSTER

METHOD AND APPARATUS FOR EXPRESSING HIGH AVAILABILITY CLUSTER DEMAND BASED ON PROBABILITY OF BREACH

BACKGROUND OF THE INVENTION

1. Technical Field

The present invention relates to an improved data processing system. In particular, the present invention relates to expressing high availability cluster demand. Still more particularly, the present invention relates to expressing high availability cluster demand based on probability of breach.

2. Description of Related Art

In a large data center, High Availability (H/A) clusters are often used to ensure that servers are available to meet business needs. A H/A cluster is designed, implemented, and deployed with sufficient components to satisfy the functional requirements but which also has sufficient redundancy in components (hardware, software and procedures) to mask certain defined faults. When using H/A clusters, it is desirable to minimize server downtime and to reduce business losses due to system errors. Currently, there are a few software products in the market that provide such functions and features. Examples of these software products include Veritas™ clustering server available from Veritas™ Software Corporation and High Availability Cluster Multiprocessing for AIX 5L V5.2.0 available from International Business Machines Corporation.

However, with existing H/A clusters, a problem exists when more resources are needed while there are no more redundant or standby resources available. One problem scenario occurs when there are two servers running in a H/A cluster. One server is active and the other server is standing by. When the active server fails, the clustering software is capable of failing over all resources to the standby server and making the standby server active. However, if the standby server also fails and there are no more resources available in the cluster, the H/A cluster can no longer provision resources to serve the client requests.

Another problem scenario is when a poisoning problem is detected. A poisoning problem occurs when the servers in the cluster keep failing no matter how many resources are added to the cluster. This poisoning problem may be caused by software errors, for example, memory leaks, software bugs, etc. When a poisoning problem is detected, the cluster notifies the administrator to fix the problem manually. However, it is often difficult for the cluster to detect the problem. Usually, a provisioning manager server, which provisions and deprovisions resources, predicts how and when the poisoning problem may occur.

Therefore, it would be advantageous to have an improved method, apparatus, and computer instructions for expressing high availability demand cluster to a provisioning manager server, such that based on a probability of breach data, the provisioning manager server may respond to the problem accordingly.

SUMMARY OF THE INVENTION

Embodiments of the present invention provide a method, an apparatus, and computer instructions in a data processing system for expressing high availability cluster demand based on probability of breach. Responsive to detecting event messages from a high availability cluster, a probability of breach based on the event messages is calculated. The mechanism of embodiments of the present invention then updates a data model of a provisioning server based on the event messages and provides a recommendation of reprovisioning to a provisioning server based on the probability of breach.

BRIEF DESCRIPTION OF THE DRAWINGS

The novel features believed characteristic of embodiments of the invention are set forth in the appended claims. Embodiments of the invention itself, however, as well as a preferred mode of use, further objectives and advantages thereof, will best be understood by reference to the following detailed description of an illustrative embodiment when read in conjunction with the accompanying drawings, wherein:

FIG. 5 is a diagram illustrating exemplary interactions between a H/A cluster and the provisioning manager server in accordance with an illustrative embodiment of the present invention;

FIG. 7 is a diagram containing examples of using calculating probability of breach in accordance with an illustrative embodiment of the present invention; and FIG. 8 is a flowchart of an exemplary process for expressing high availability demand based on probability of breach in accordance with an illustrative embodiment of the present invention.

DETAILED DESCRIPTION OF THE PREFERRED EMBODIMENT

Figure 1:
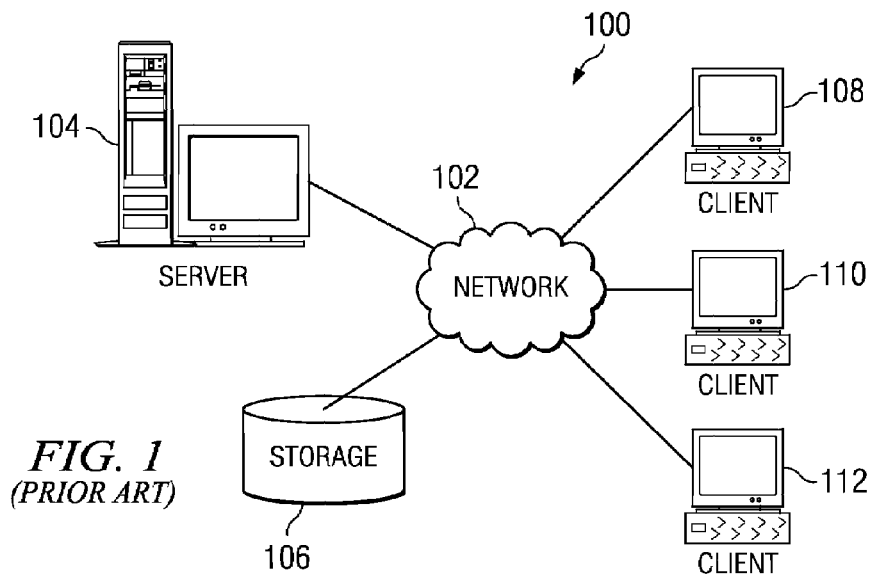
FIG. 1 depicts a pictorial representation of a network of data processing systems in which embodiments of the present invention may be implemented.

With reference now to the figures, FIG. 1 depicts a pictorial representation of a network of data processing systems in which embodiments of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. Clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for embodiments of the present invention.

Figure 2:
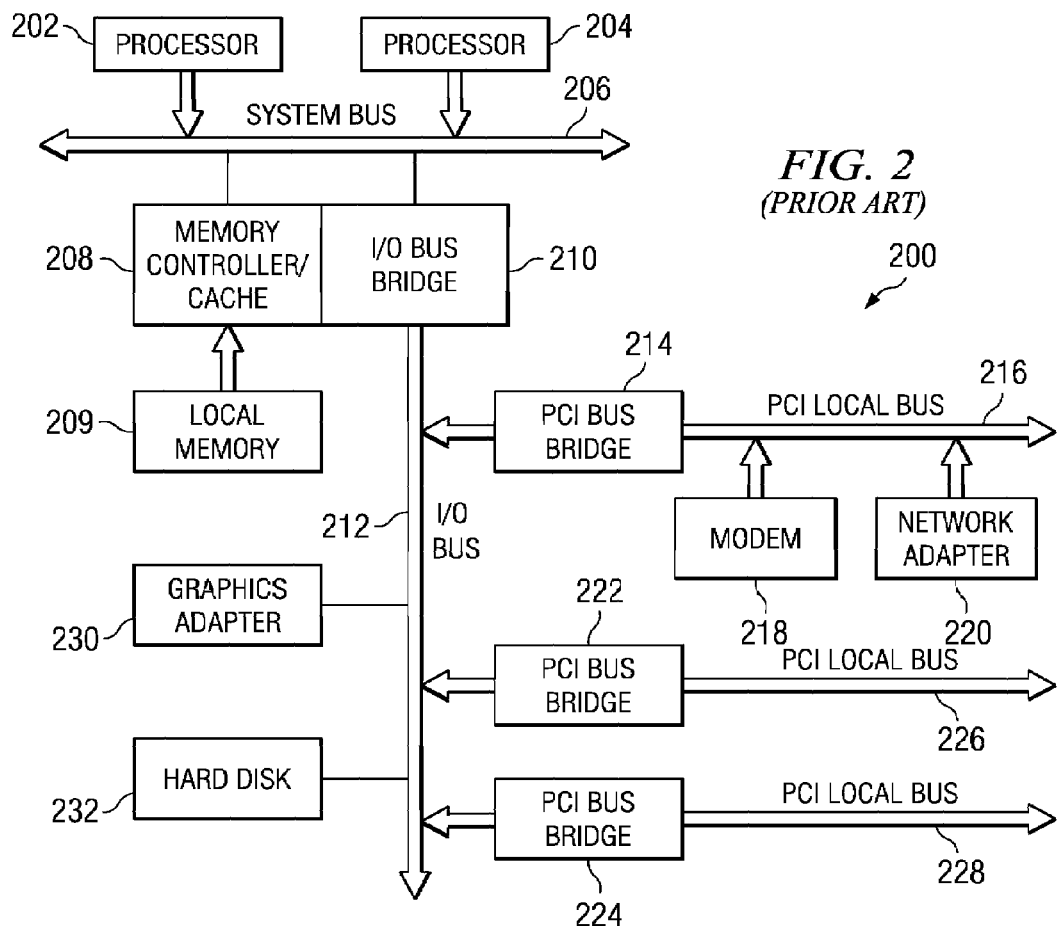
FIG. 2 is a block diagram of a data processing system that may be implemented as a server, in accordance with an illustrative embodiment of the present invention.

Referring to FIG. 2, a block diagram of a data processing system that may be implemented as a server, such as server 104 in FIG. 1, is depicted in accordance with an embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. Memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to embodiments of the present invention.

The data processing system depicted in FIG. 2 may be, for example, an IBM eServer pseries system, a product of International Business Machines Corporation in Armonk, N.Y., running the Advanced Interactive Executive (AIX) operating system or the LINUX operating system.

Figure 3:
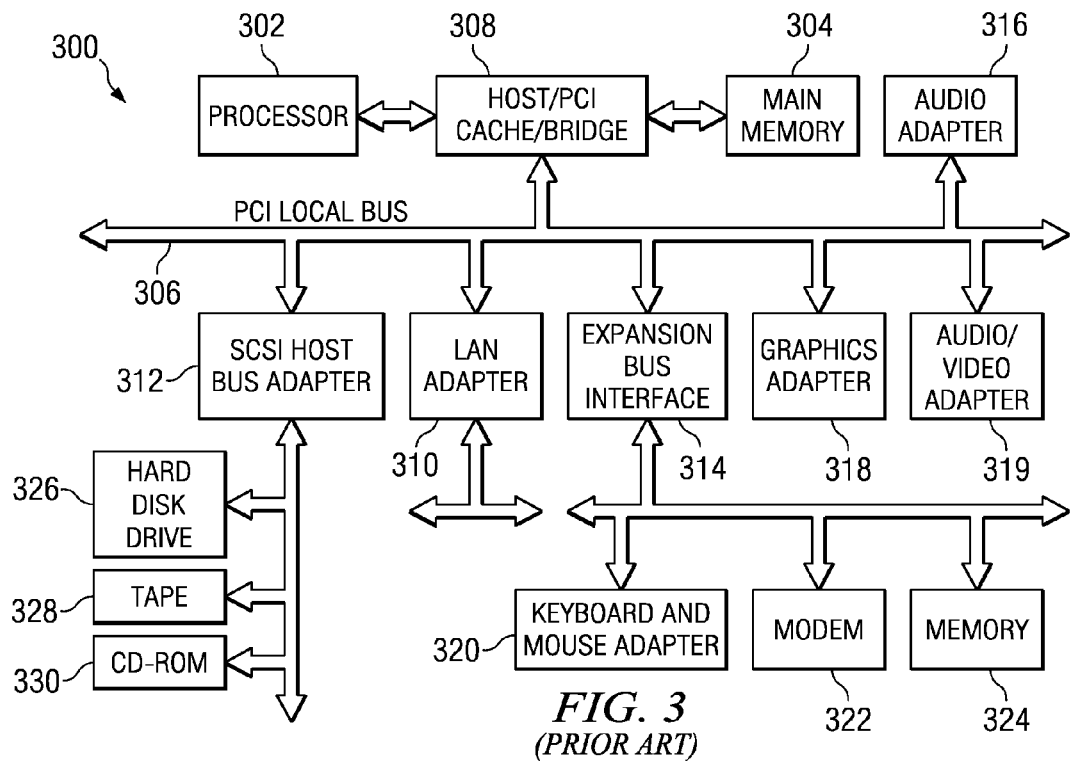
FIG. 3 is a block diagram of a data processing system in which an illustrative embodiment of the present invention may be implemented.

With reference now to FIG. 3, a block diagram illustrating a data processing system is depicted in which embodiments of the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for keyboard and mouse adapter 320, modem 322, and memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows® XP, which is available from Microsoft Corporation. An object-oriented programming system, such as Java, may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326 and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent non-volatile memory, or optical disk drives and the like, may be used in addition to or in place of the hardware depicted in FIG. 3. Also, the processes of embodiments of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
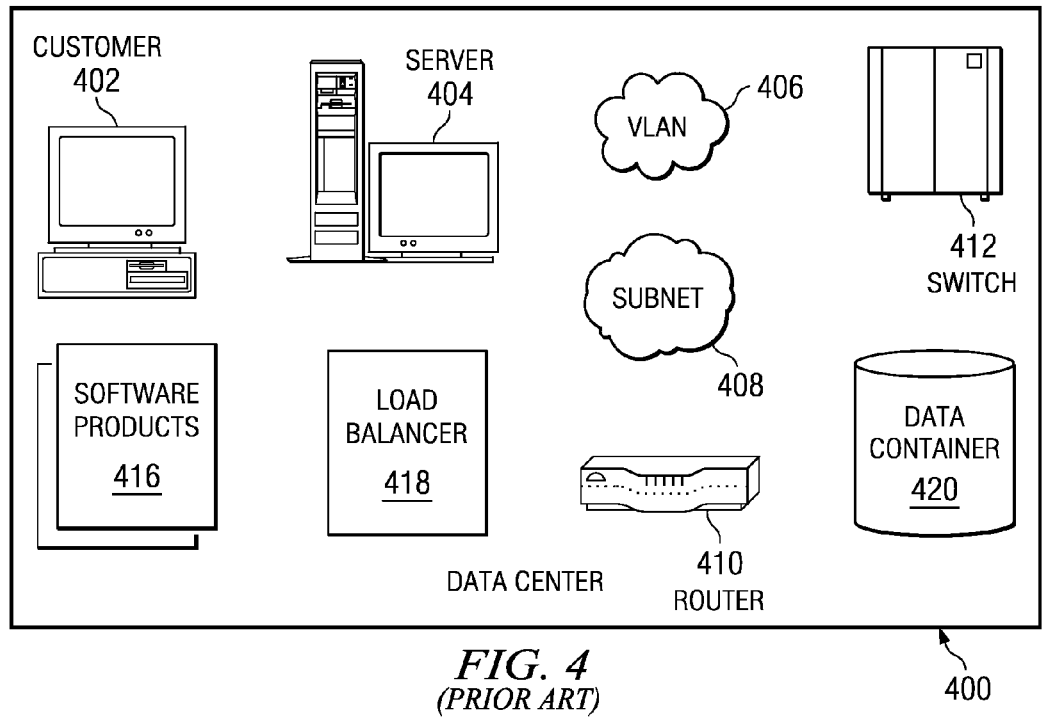
FIG. 4 is a diagram illustrating an exemplary data center, in accordance with an illustrative embodiment of the present invention.

Turning now to FIG. 4, a diagram illustrating an exemplary data center is depicted, in accordance with an embodiment of the present invention. As shown in FIG. 4, in this illustrative example, data center 400 includes resources, such as, customer 402, server 404, Virtual Local Area Network (VLAN) 406, subnet 408, router 410, switch 412, software products 416, load balancer 418, and data container 420.

Customer 402 may be, for example, a client or an administrator who uses a data processing system, such as data processing system 300 in FIG. 3. Server 404 may be implemented as a data processing system, such as data processing system 200 in FIG. 2. Server 404 may also be implemented as an application server, which hosts Web services or other types of servers. Router 410 and switch 412 facilitate communications between different devices. VLAN 406 is a network of computers that behave as if they are connected to the same wire even though they may actually be physically located on different segments of a local area network. Subnet 408 is a portion of a network, which may be a physically independent network segment and shares a network address with other portions of the network.

Software products 416 are applications that may be deployed to a client or a server. Load balancer 418 spreads traffic among multiple systems such that no single system is overwhelmed. Load balancer 418 is normally implemented as software running on a data processing system. Data container 420 may be a database, such as DB2 Universal Database, a product available from International Business Machines Corporation.

Data center 400, as depicted in FIG. 4, is presented for purposes of illustrating embodiments of the present invention. Other resources, such as, for example, a cluster of servers and switch ports, may also be included in data center 400. The mechanism of an embodiment of the present invention reports failover and potential poisoning situation of resources, such as server 404, to a provisioning manager server. An example of a provisioning manager server is Tivoli Intelligent ThinkDynamics Orchestrator (TITO), a product available from International Business Machines Corporation.

Embodiments of the present invention provide a method, apparatus, and computer instructions for expressing high availability cluster demand based on a probability of breach data. A probability of breach data indicates the probability of a service level agreement breach. A service level agreement breach is a failure of a cluster to meet the specified service level agreement (SLA) for an application. The processes of embodiments of the present invention are performed by a processing unit that comprises one or more processors, such as processor 302 in FIG. 3, using computer implemented instructions, which may be located in a memory such as, for example, main memory 304, memory 324, or in one or more peripheral devices 326 and 330 in FIG. 3.

In an illustrative embodiment, the mechanism of embodiments of the present invention may be implemented in a provisioning manager server that detects events reported by clustering software when failovers and potential poisoning problems are encountered. When the clustering software in the H/A cluster detects that resources are failover to a standby server due to failure of the active server, event messages are generated by the clustering software and sent to the provisioning manager server.

In an illustrative embodiment, event messages may include information, such as, for example, the name of the cluster domain, the name of the failed node, the name of the node to which the clustering software failover resources, service class factor indicating the importance of the failover to an application, timestamps indicating when the failure and failover occurred, and event descriptions that describe reasons for the failure.

When the provisioning manager server receives the generated events, the mechanism of embodiments of the present invention first filters out the irrelevant events and then translates the events into a probability of breach data based on a mathematical formula. This formula may be calculated using the service class factor, the number of active servers, and the number of failed servers. The service class factor is defined for the H/A cluster based on a service level agreement. The service class factor is defined for the H/A cluster and reflects the high availability service class level, for example, gold, silver, and bronze. The clustering software in the H/A cluster typically decides what service class factor to be sent to provisioning manager server based on the service level agreement for the cluster application.

In addition, the mechanism of embodiments of the present invention in the provisioning manager server updates the cluster model accordingly to synchronize changes in the H/A cluster based on the event messages received. Thus, the state of the hardware and the data model is synchronized.

Based on the calculated probability of breach data, the mechanism of embodiments of the present invention in the provisioning manager server makes a recommendation as to whether servers should be reprovisioned to the H/A cluster in order to maintain high availability for the application. If reprovisioning is recommended, the mechanism of embodiments of the present invention reprovisions the servers to the H/A cluster by executing workflows to add or configure servers to the cluster. In this way, by expressing H/A cluster demand to the provisioning manager server based on a probability of breach, poisoning problems may be avoided.

Turning now to FIG. 5, a diagram illustrating exemplary interactions between H/A cluster and the provisioning manager server is depicted in accordance with an illustrative embodiment of the present invention. As shown in FIG. 5, data center 500 includes H/A cluster 502 and provisioning manager server 504.

Within H/A cluster 502, two server nodes are present: node 1 and node 2. Node 1 is an online server, while node 2 is a standby server. When node 1 experiences a failure, node 2 becomes active and the clustering software in H/A cluster 502 then generates and sends event messages to provisioning manager server 504. In an alternative embodiment, other situations may also trigger event messages to be sent. For example, when configuration of the existing node changes, or when a new calculation of probability of breach is needed because new nodes are provisioned or existing nodes are deprovisioned.

Event message 506 may include the name of the cluster domain, in this example, H/A cluster 502; the name of the failed node, in this example, node 1; the name of the node to which clustering software failover resources, in this example, node 2; the service class factor indicating importance of the failover situation to an application; timestamps when the failure and failover occur; and event descriptions that describe reasons for the failure.

The service class factor is defined for H/A cluster 502 and reflects the high availability service class level, for example, gold, silver, and bronze. The clustering software in H/A cluster 502 typically decides what service class factor is to be sent to provisioning manager server 504 based on the service level agreement for the cluster application.

Once provisioning manager server 504 receives event message 506, the mechanism of embodiments of the present invention in provisioning manager server 504 filters out events 508 that are not relevant and calculates a probability of breach (PoB) 510 using mathematical formula. More details regarding the mathematical formula is discussed in FIG. 6. Once the PoB is calculated, the mechanism of embodiments of the present invention updates data model 512 in provisioning manager server 504 to synchronize with the hardware state of H/A cluster 502. Then, the mechanism of embodiments of the present invention makes a recommendation as to whether to reprovision new server nodes 514 to H/A cluster 502. Typically, the higher the PoB, the less likely reprovisioning is recommended, since there is a higher probability of a poisoning problem. If, however, new node reprovisioning is recommended 516, the mechanism of embodiments of the present invention executes workflow to add or configure new node 518 to the H/A cluster 502.

Figure 6:
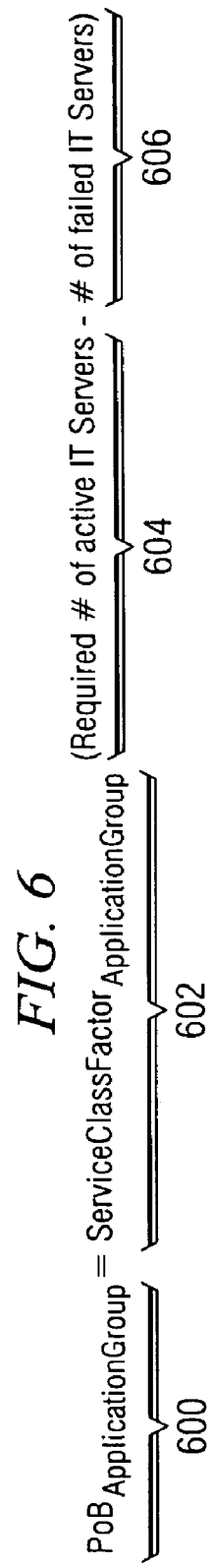
FIG. 6 is a diagram illustrating an exemplary probability of breach data formula in accordance with an illustrative embodiment of the present invention.

Turning now to FIG. 6, a diagram illustrating an exemplary probability of breach data formula is depicted in accordance with an illustrative embodiment of the present invention. As shown in FIG. 6, probability of breach (PoB) of an application group 600 is calculated using a mathematical formula. An application group is composed of managed resources or resource groups. H/A clusters usually accommodates more than one resource group.

As shown in FIG. 6, PoB 600 is calculated by raising service class factor of application group 602 to the power of the difference between the number of required active servers 604 and the number of failed or missing servers 606. This difference may range between zero and the number of required servers 604. The higher the difference, the lower PoB 600 will be since there are less failed servers. If the difference is zero, PoB 600 of 1 is returned as a result.

In an illustrative embodiment, PoB 600 is an abstract expression of breaching a goal. The value of PoB 600 is between 0 and 1. A PoB of 0 reflects no breaching while a PoB of 1 reflects a certain existing breaching. As described above, service class factor 602 is defined by the clustering software of the H/A cluster based on the service level agreement of the application.

Turning now to FIG. 7, a diagram containing examples of using calculating probability of breach is depicted in accordance with an illustrative embodiment of the present invention. As shown in FIG. 7, case 1 700 calculates PoB for a two-node cluster with a first node used to host the workload and a second node used as a cold backup. The number of required active servers is 2 while the service class factor is 0.75 (gold level). In case 1 700, during normal production running with no additional servers required, PoB 702 is $0.75^2=0.56$. However, if one server fails and only one additional server is required, PoB 704 becomes $0.75^{2-1}=0.75$. If both servers fail and two additional servers are required, PoB 706 becomes $0.75^{2-2}=1.0$.

Case 2 708 calculates a PoB for a four-node cluster hosting two applications, App1 and App2. While each application uses the two nodes separately, every other node may be used as backup. The customer has required a 'silver' level goal, 0.5, accepting that a backup server is used. In case 2 708, during normal production with no additional server required, $PoB_{app1}$ 710 is $0.5^4=0.0625$. If two servers fail, two additional servers are required and $PoB_{app1}$ 714 becomes $0.5^{4-2}=0.125$. If all four servers fail, four additional servers are required and $PoB_{app1}$ 718 becomes $0.5^{4-4}=1.0$. Similarly, $PoB_{app2}$ 712 is also $0.5^4=0.0625$ for normal production, $0.5^{4-2}=0.125$ for losing two servers 716 and $0.5^{4-4}=1.0$ for losing all four servers 720.

Case 3 722 is similar to case 2 708 except that the customer requested level is gold, 0.75. This means that for each application, two additional backup servers are needed and each server in the cluster is dedicated for either one of the applications. In case 3 722, during normal production, $PoB_{app1}$ 724 is $0.75^4=0.31$. Similarly, $PoB_{app2}$ 726 is also $0.75^4=0.31$. When one of the servers for App1 fails, two additional servers are required. Thus, $PoB_{app1}$ 728 is $0.75^{4-2}=0.562$. However, unlike case 2 708, $PoB_{app2}$ 730 stays the same since the two lost servers were dedicated to App1. If the complete cluster is lost, $PoB_{app1}$ 732 and $PoB_{app2}$ 734 are $0.75^{4-4}=1.0$.

Turning now to FIG. 8, a flowchart of an exemplary process for expressing high availability demand based on probability of breach is depicted in accordance with an illustrative embodiment of the present invention. As depicted in FIG. 8, the process begins when the mechanism of embodiments of the present invention in the provisioning manager server detects event messages sent by clustering software in the H/A cluster (step 802). Event messages may be sent when a node failover, if configuration of existing nodes changes, if a new node is provisioned or an existing node is deprovisioned.

Once the events are received, the mechanism of embodiments of the present invention filters out irrelevant events (step 804) and translates the event into probability of breach (step 806) to indicate the probability of a service level agreement breach. The probability of breach is calculated using the mathematical formula shown in FIG. 6. Typically, PoB is calculated for each application group. If more than one application group is present, the PoBs of all application groups are normalized to a single PoB.

After the PoB is calculated, the mechanism of embodiments of the present invention updates the data model of the provisioning manager server based on the events received (step 808). Examples of updating the data model include marking the failed servers, marking the observed state or desired state of the new master server, removing a failed server from the application tier, and updating the cluster resource states for both failed and failover servers.

Once the data model of the provisioning manager server is updated, the mechanism of embodiments of the present invention makes a recommendation for reprovisioning new nodes based on the calculated PoB (step 810). A determination is then made by the provisioning manager server as to whether to reprovision new nodes to the H/A cluster (step 812). This decision is based on not only the PoB but also whether a potential poisoning situation is detected. A potential poisoning situation may occur when the PoB is high and the number of failed servers detected by the provisioning manager server for a period of time is abnormal.

To handle the poisoning situation, the provisioning manager server maintains an event history of all events received from a given H/A cluster. The provisioning manager server may use an event analysis algorithm to analyze the pattern of failed events received for a certain period of time. If the same failed event is received with a same failed reason within a period of time after a number of reprovisionings are executed, the provisioning manager server may mark this case as a potential situation.

If the provisioning manager server determines that a new node should be reprovisioned, the provisioning manager server executes a workflow to add or configure the new node to the H/A cluster (step 814). However, if the provisioning manager server determines not to reprovision the new node, the provisioning manager server notifies the system administrator (step 816) of the detected poisoning problem, such that the administrator may take appropriate actions. Thus, the process terminates thereafter.

In summary, embodiments of the present invention provide a way to express high availability cluster demand to a provisioning manager server based on a probability of breach data to a service level agreement. With embodiments of the present invention, potential poisoning problems may be detected as new nodes are reprovisioned or as existing nodes are deprovisioned. In this way, administrators may be notified to take the appropriate actions.

It is important to note that while embodiments of the present invention have been described in the context of a fully functioning data processing system, those of ordinary skill in the art will appreciate that the processes of embodiments of the present invention are capable of being distributed in the form of a computer usable medium of instructions and a variety of forms and that embodiments of the present invention apply equally regardless of the particular type of signal-bearing media actually used to carry out the distribution. Examples of computer usable media include recordable-type media such as a floppy disc, a hard disk drive, a RAM, and CD-ROMs and transmission-type media such as digital and analog communications links.

The description of embodiments of the present invention have been presented for purposes of illustration and description but is not intended to be exhaustive or limited to embodiments of the invention in the form disclosed. Many modifications and variations will be apparent to those of ordinary skill in the art. The embodiment was chosen and described in order to best explain the principles of embodiments of the invention, the practical application, and to enable others of ordinary skill in the art to understand the invention for various embodiments with various modifications as are suited to the particular use contemplated.

What is claimed is:

1. A method in a data processing system for expressing high availability cluster demand based on probability of breach, the method comprising: detecting event messages from a high availability cluster;

calculating a probability of breach based on the event messages detected from the high availability cluster;

updating a data model of a provisioning server based on the event messages, responsive to calculating the probability of breach; and providing a recommendation of reprovisioning to the provisioning server based on the probability of breach, wherein the calculating step comprises:

determining a difference between a number of required active servers and a number of failed servers; and raising a service class factor to a power of the difference, wherein the service class factor indicates a service level agreement of a cluster application.

* * * * *